(12) United States Patent
Hanano et al.

(10) Patent No.: US 9,114,778 B2
(45) Date of Patent: Aug. 25, 2015

(54) GAS GENERATOR

(71) Applicant: Daicel Corporation, Osaka-shi, Osaka (JP)

(72) Inventors: Teppei Hanano, Tatsuno (JP); Katsuhiro Imoto, Tatsuno (JP); Haruhiko Yamashita, Tatsuno (JP)

(73) Assignee: DAICEL CORPORATION, Osaka (JP)

( * ) Notice: Subject to any disclaimer, the term of this patent is extended or adjusted under 35 U.S.C. 154(b) by 16 days.

(21) Appl. No.: 14/179,367

(22) Filed: Feb. 12, 2014

(65) Prior Publication Data

US 2014/0230685 A1 Aug. 21, 2014

Related U.S. Application Data

(60) Provisional application No. 61/766,570, filed on Feb. 19, 2013.

(30) Foreign Application Priority Data

Feb. 18, 2013 (JP) ................................. 2013-028578

(51) Int. Cl.
| | |
|---|---|
| *C06D 5/00* | (2006.01) |
| *B60R 21/261* | (2011.01) |
| *B60R 21/263* | (2011.01) |
| *B60R 21/264* | (2006.01) |

(52) U.S. Cl.
CPC ..... *B60R 21/2644* (2013.01); *B60R 2021/2648* (2013.01)

(58) Field of Classification Search
CPC .. B60R 21/261; B60R 21/263; B60R 21/264; B60R 21/16; C06D 5/00

USPC .............. 102/530, 531; 280/728.1, 741, 736, 280/742, 740, 737
See application file for complete search history.

(56) References Cited

U.S. PATENT DOCUMENTS

| | | | | |
|---|---|---|---|---|
| 3,972,545 | A | * | 8/1976 | Kirchoff et al. ................ 280/735 |
| 5,551,724 | A | * | 9/1996 | Armstrong et al. ............ 280/737 |
| 6,289,820 | B1 | * | 9/2001 | Anacker et al. ................ 102/530 |
| 6,460,884 | B1 | * | 10/2002 | Nakashima et al. ........... 280/741 |

(Continued)

FOREIGN PATENT DOCUMENTS

| | | |
|---|---|---|
| JP | 2001-165600 A | 6/2001 |
| JP | 2005-238907 A | 9/2005 |

(Continued)

*Primary Examiner* — Jonathan C Weber
(74) *Attorney, Agent, or Firm* — Birch, Stewart, Kolasch & Birch, LLP

(57) ABSTRACT

A gas generator includes a cylindrical housing, a diffuser portion, a first combustion chamber defined by a first porous plate member, a second combustion chamber defined by a second porous plate member, and an ignition device having an ignition portion attached to an igniter collar. The first porous plate member comprises first through holes arranged in the vicinity of a peripheral edge portion. An annular space is formed between an outer peripheral surface of the ignition portion and an inner peripheral wall surface of the cylindrical housing. The height (H) of a top surface of the ignition portion from the igniter collar and a smallest length (Lmin) of a first gas generating agent in the first combustion chamber satisfies a relation Lmin<H. An axis of the cylindrical housing is coincident with a central line of the ignition portion, the first porous plate member, and the second porous plate member.

7 Claims, 4 Drawing Sheets

(56) References Cited

U.S. PATENT DOCUMENTS

| | | | |
|---|---|---|---|
| 6,491,321 B1 * | 12/2002 | Nakashima et al. | 280/736 |
| 6,718,884 B1 | 4/2004 | Yabuta et al. | |
| 7,073,820 B2 | 7/2006 | McCormick | |
| 7,343,862 B2 * | 3/2008 | McCormick | 102/530 |
| 7,654,565 B2 * | 2/2010 | McCormick et al. | 280/736 |
| 7,814,838 B2 * | 10/2010 | McCormick | 102/530 |
| 7,878,536 B2 * | 2/2011 | Rose et al. | 280/737 |
| 7,950,691 B1 * | 5/2011 | Mayville | 280/736 |
| 8,302,992 B2 * | 11/2012 | Hanano et al. | 280/740 |
| 2002/0148543 A1 * | 10/2002 | Rink et al. | 149/46 |
| 2004/0262900 A1 | 12/2004 | Yoshida et al. | |
| 2005/0194772 A1 | 9/2005 | Numoto et al. | |
| 2006/0174794 A1 | 8/2006 | Cook et al. | |
| 2007/0001438 A1 | 1/2007 | Patterson et al. | |
| 2007/0024038 A1 * | 2/2007 | Numoto et al. | 280/736 |
| 2008/0078486 A1 * | 4/2008 | Khandhadia et al. | 149/109.2 |
| 2011/0187088 A1 | 8/2011 | Hanano et al. | |

FOREIGN PATENT DOCUMENTS

| | | |
|---|---|---|
| JP | 2006-219125 A | 8/2006 |
| JP | 2009-1221 A | 1/2009 |
| JP | 2009-500223 A | 1/2009 |
| JP | 2011-157025 A | 8/2011 |
| WO | WO 03/042010 A1 | 5/2003 |
| WO | WO 2007/005824 A2 | 1/2007 |

* cited by examiner (a)          (b)

GAS GENERATOR

This nonprovisional application claims priority under 35 U.S.C. §119(a) to Patent Application No. 2013-028578 filed in Japan on 18 Feb. 2013, and 35 U.S.C. §119(e) to U.S. Provisional Patent Application No. 61/766,570 filed on 19 Feb. 2013, both of which are incorporated by reference.

BACKGROUND OF INVENTION

1. Field of Invention

The present invention relates to a gas generator used in a restraining device for vehicles such as an airbag apparatus.

2. Description of Related Art

Some of gas generators for deploying an airbag have an elongated cylindrical housing because of their attachment position. In such gas generators, an igniter is attached to one end thereof and a gas discharge port is provided on the other end.

When the igniter is separated from the gas discharge port in this manner, a lead wire connected to the igniter does not become an obstacle at the time of attaching an airbag around the gas discharge port, which is advantageous because the attachment to a vehicle is facilitated.

However, with the igniter provided at one end, when ignition of a gas generating agent progresses from one end to the other end, the gas generating agent ignites easily in some positions whereas it does not easily ignite in some other positions.

In a gas generator 10 disclosed in U.S. Pat. No. 7,073,820, an igniter 20 is disposed in one end of an elongated housing 12, and a gas generating agent 30 is charged around the igniter 20.

A chamber in which the igniter 20 is disposed and the gas generating agent 30 is filled and a chamber 21 in which another gas generating agent 99 is filled are partitioned by a spacer 18 provided with a communication hole 19 in a central portion thereof. The communication hole 19 is closed by a seal 97.

Moreover, since the igniter 20 is disposed in such a state that an ignition portion protrudes into a combustion chamber, a pocket-like annular space is formed near an end closure 22 and the gas generating agent 30 is also present in the annular space.

FIG. 1 of JP-A No. 2011-157025 shows a gas generator that includes a first porous plate member 14 and a second porous plate member 32.

SUMMARY OF INVENTION

The present invention provides a gas generator including a cylindrical housing with an ignition device attached at one end and a diffuser portion, which has a gas discharge port, attached at the other end, a first combustion chamber formed inside the cylindrical housing at the one end to which the ignition device is attached, being defined by a first porous plate member, and being charged with a molded article of first gas generating agent, a second combustion chamber formed in the cylindrical housing and defined by a second porous plate member, which is disposed axially at a distance from the first porous plate member and has a second through hole, the second combustion chamber being charged with a molded article of second gas generating agent, the ignition device provided by fixing an igniter main body with a columnar ignition portion, to a fixing member including an igniter collar, the ignition portion disposed to protrude inside the first combustion chamber, the first porous plate member having first through holes, a proportion of a first total opening area of only outer first through holes arranged in the vicinity of a peripheral edge portion and in a circumferential direction of the first porous plate member to a total opening area of the first through holes in the first porous plate member being not less than 95%, axial end surfaces of the first combustion chamber respectively formed by the first porous plate member, and the ignition portion of the igniter main body and the igniter collar, an annular space formed between an outer peripheral surface of the ignition portion and an inner peripheral wall surface of the cylindrical housing, which radially faces the outer peripheral surface of the ignition portion, the annular space having a bottom surface defined by the igniter collar, a height (H) of a top surface of the ignition portion from the bottom surface and a smallest length (Lmin) of the molded article of the first gas generating agent charged in the first combustion chamber satisfying a relation of Lmin<H, and an axis X of the cylindrical housing being coincident with a central line of the ignition portion of the igniter main body, the first porous plate member, and the second porous plate member.

BRIEF DESCRIPTION OF DRAWINGS

The present invention will become more fully understood from the detailed description given hereinbelow and the accompanying drawings which are given by way of illustration only, and thus are no limitative of the present invention and wherein.

DETAILED DESCRIPTION OF INVENTION

Figure 1:
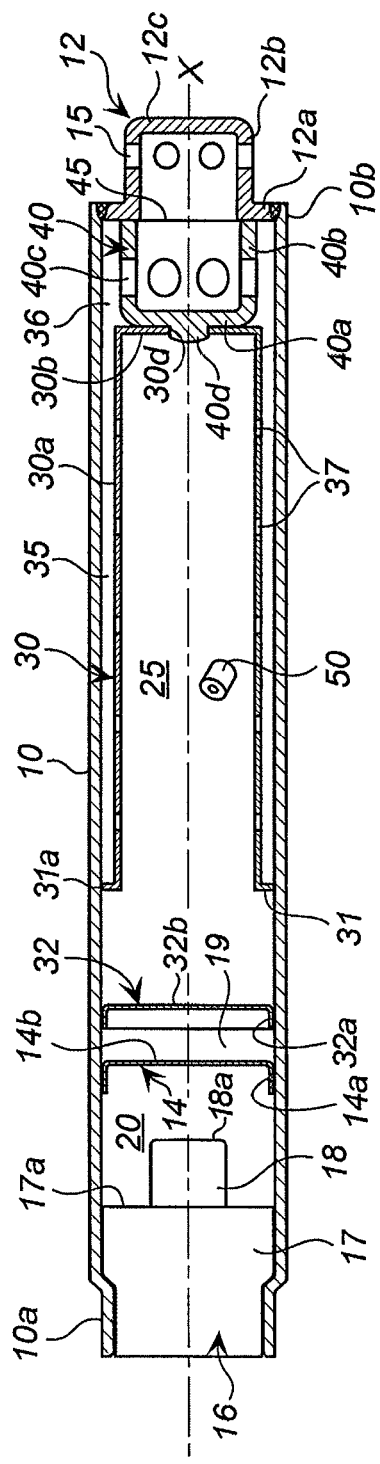
FIG. 1 shows a cross-sectional view in the axial direction of a gas generator according to the present invention.

In U.S. Pat. No. 7,073,820, since the ignition portion of the igniter 20 is disposed to face the communication hole 19, a combustion product generated due to activation flow linearly through the communication hole 19 to the adjacent chamber 21. As a result, the gas generating agent present in the pocket-like annular space may not be easily ignited.

If the ignition of the gas generating agent 30 in the annular space is delayed or the gas generating agent 30 is remained without burning out, designed performance is not obtained.

Although it is described in JP-A No. 2011-157025 that the first porous plate members 14 and the second porous plate member 32 includes a plurality of holes, there is no description as to a hole arrangement.

In FIG. 1, when compared with the configuration in U.S. Pat. No. 7,073,820, an ignition portion 16a of an igniter 16 protrudes relatively in a small distance, hence a pocket-like annular space, like a gas generator 10 disclosed in U.S. Pat. No. 7,073,820, is not formed substantially. Due to this, although it is unlikely occurred that ignition is delayed in the first combustion chamber 20 including the igniter 16, a gas generating agent, disposed away from the discharge direction of the combustion products generated from the ignition portion 16a, is not easily ignited.

The present invention is to provide an elongated gas generator capable of burning out an entire molded article of the gas generating agent as designed even when a pocket-like annular space, in which the molded article of the gas generating agent is present, exists around an igniter.

The first combustion chamber is formed by being surrounded by the cylindrical housing, the first porous plate member, and the ignition device (the igniter and the igniter collar).

In the invention, the first through holes contain plural holes connecting the inside of the first combustion chamber with an outside thereof in view of the gas communication. The outer first through holes are provided at a peripheral edge and arranged in the circumferential direction of the first porous plate member.

The first porous plate member has preferably first through holes consisting of only outer first through holes arranged in the circumferential direction and provided only in the vicinity of the peripheral edge portion thereof. The first through holes may also be formed in a portion excluding the portion in the vicinity of the peripheral edge portion. The outer first through holes are through holes corresponding to those in the outermost position of the first porous plate member. The first through holes may be closed by a seal tape.

In this case, the proportion of the first total opening area of only the outer first through holes in the vicinity of the peripheral edge portion to the total opening area of the first through holes of the first porous plate member is not less than 95%, and preferably not less than 98%, and more preferably 100%.

When "r" is the radius from the central point (where the axis X of the cylindrical housing passes) of the first porous plate member (circular) to the circumference thereof, it is preferable to set a position of each of the first through holes in the vicinity of the peripheral edge portion such that a distance from the peripheral edge portion to the centers of the respective through holes is preferably within 0.2r (within 20% of the radius r) and more preferably within 0.15r (within 15% of the radius r).

In the ignition device, the igniter main body including the ignition portion is fixed by the fixing member including the igniter collar, and the ignition portion is disposed to protrude into the first combustion chamber.

Thereby, the pocket-like annular space whose bottom surface is the igniter collar is formed between the outer peripheral surface of the ignition portion protruding into the first combustion chamber and the inner peripheral wall surface of the cylindrical housing.

The first gas generating agent includes a plurality of gas generating agent bodies or articles. When the first gas generating agent is charged in the first combustion chamber, some of the bodies or part of the body is disposed in the pocket-like annular space.

When the molded article of the first gas generating agent is charged in the first combustion chamber during the manufacturing process of the gas generator, a required amount of the molded article of the first gas generating agent is poured into the space (the first combustion chamber) serving as a combustion chamber in such a way that the molded articles of the first gas generating agent are not aligned.

Thus, when the molded article of the gas generating agent is cylindrical, for example, the molded article of the gas generating agent is loaded in various orientations, and a gap is present between the adjacent molded articles of the gas generating agent.

After that, an operation to eliminate the gap such as applying vibration from the outside is performed. Then, the molded article of the gas generating agent is pressed from both side in the axial direction by the fixing member (in the present invention, the first porous plate member and the ignition device) to closely fix the molded article of the gas generating agent without the gap.

The molded article of the gas generating agent is charged in this manner, some molded article of the gas generating agent may be positioned, in the annular space, within an area lower than the height (H) of the top surface, of the columnar ignition portion (only in the side of the igniter collar), although it is not possible to check the charging state of the molded article of the gas generating agent after charging.

That is, with Lmin>H, the molded article of the gas generating agent protrudes out of the annular space. However, with Lmin<H in some charging states, some of the molded article of the gas generating agent may be buried or confined in the annular space, within an area lower than the height (H) of the top surface of the columnar ignition portion.

Here, the smallest length (Lmin) of the molded article of the gas generating agent is a diameter when the molded article of the gas generating agent is columnar, and is the thickness when the molded article of the gas generating agent is disk-shaped, for example.

When the igniter is activated and the combustion product is discharged from the ignition portion, including the cases of being discharged axially or radially, the combustion product is discharged forward, further than the ignition portion (the top surface of the ignition portion).

In this case, if a portion including the central portion (the portion coincident with the axis X) of the first porous plate member is open widely (or opened widely by rupture of the seal tape), most of the combustion products from the ignition portion are directly discharged outside the first combustion chamber, there may be occurred that the molded article of first gas generating agent charged in the pocket-like annular space of the first combustion chamber is ignited with delay, or not burn up completely.

However, in the present invention, since most through holes are formed in the vicinity of the peripheral edge portion of the first porous plate member, most of the combustion product, discharged from the ignition portion, collides the first porous plate member (the portion where less number of first through holes is formed or no first through holes are formed) and is diffused inside the first combustion chamber (the combustion product also reaches the pocket-like annular space by deflection).

Therefore, when the relation of Lmin<H, preferably H/Lmin=2 to 5, is satisfied, even when there is a lot of molded article of the gas generating agent charged, in the annular space, within an area lower than the height (H) of the top surface of the columnar ignition portion, all of the molded article of first gas generating agent charged in the pocket-like annular space of the first combustion chamber is ignited easily, and delayed ignition or incompletion of combustion will not occur.

It is preferable that the first porous plate member has the first through holes consisting of only the outer first through holes formed in the circumferential direction and only in the vicinity of the peripheral edge portion thereof.

It is preferably that the present invention provides a gas generator according to the invention, wherein a ratio (a2/a1) of a total opening area (a2) of the second through hole formed in the second porous plate member and a total opening area (a1) of the first through holes formed in the first porous plate member is between 0.9 and 1.2.

The combustion gas, generated by combustion of the molded article of first gas generating agent in the first combustion chamber, flows into the space (a combustion gas migration space) between the first porous plate member and the second porous plate member and then flows into the second combustion chamber through the through holes of the second porous plate member.

In this case, when a2/a1 satisfies the above, the migration of the combustion gas from the through holes of the first porous plate member to the combustion gas migration space and from the combustion gas migration space to the through holes of the second porous plate member is preferably more accelerated.

It is preferably that the present invention provides a gas generator according to the invention, wherein
a cylindrical member provided with a communication hole in a peripheral wall portion is further disposed in the second combustion chamber,
the cylindrical member is disposed so as to form a gap between an inner peripheral wall surface of the cylindrical housing and the peripheral wall portion of the cylindrical member, and
the cylindrical member has a first opening end, preferably having an enlarged diameter portion and an outer peripheral edge, on a side of the second porous plate member, that abuts against the inner peripheral wall surface of the cylindrical housing, and, at the opposite side, a second end, preferably having a bottom surface and a central hole, that is supported on a side of the diffuser portion.

The cylindrical member has the communication hole (preferably, a plurality of communication holes) in the peripheral wall portion, and is preferably formed of an elastic metal. The communication hole may be formed in the peripheral wall portion of the cylindrical member axially and circumferentially at equal intervals. Moreover, the communication holes may be unevenly distributed on the cylindrical member nearer to the diffuser portion, and in this case, the number and diameter of the communication holes are adjusted so that the opening area in the diffuser portion side increases.

The cylindrical member is disposed to form a gap (a cylindrical gap) between the cylindrical member and the inner peripheral wall portion of the cylindrical housing, and has the first opening end, that abuts against the inner peripheral wall surface of the housing and faces one end (on the side of the ignition device) of the housing, and the second end supported on the side of the diffuser portion.

In order to form the gap between the cylindrical member and the inner peripheral wall surface of the cylindrical housing, the outer diameter (the outer diameter of the peripheral wall portion) of the cylindrical member is set to be smaller than the inner diameter of the cylindrical housing.

The cylindrical member is provided with the communication hole formed in the peripheral wall portion, and the inside of the cylindrical member (the second combustion chamber) and the cylindrical gap communicate with each other through the communication hole.

When the cylindrical gap is formed, the cylindrical gap serves as a discharge passage for combustion gas flowing to the diffuser portion when an inflator is activated.

While the combustion gas flows through the cylindrical gap toward the diffuser portion, the combustion gas easily comes into contact with the cylindrical member (the peripheral wall portion) and the inner peripheral wall surface of the cylindrical housing, which define the gap. As a result, functions of correcting residues and cooling the gas are improved.

In addition, since the gas flowing through the cylindrical gap reaches the gas discharge port without being obstructed, the period of time from ignition to gas discharge is preferably reduced.

It is preferably that the present invention provides a gas generator according to the invention, wherein
the cylindrical member includes an enlarged diameter in which a diameter of an opening portion on a side of the first opening end is enlarged and a central hole formed at a center of a bottom surface on a side of the second end,
a cup-like shaped gas diverting member having a communication hole in a peripheral wall portion and a projection on a bottom surface, is disposed on the side of the diffuser portion, whose opening is arranged to face the diffuser portion,
the first opening end of the cylindrical member abuts against the inner peripheral wall surface of the cylindrical housing, and
the central hole of the cylindrical member is fitted to the projection on the bottom surface of the gas diverting member.

The cylindrical member has an enlarged diameter portion in which a diameter of the opening portion on the side of the first opening end (that is, on the side of the ignition device and the first combustion chamber) is enlarged, and the enlarged diameter portion abuts against the inner peripheral wall surface of the cylindrical housing. Before the cylindrical member is disposed into the cylindrical housing, the outer diameter of the enlarged diameter portion is, for example, adjusted to be slightly larger than the inner diameter of the cylindrical housing. Thereby, the enlarged diameter portion and the inner peripheral wall surface of the cylindrical housing tightly abut against each other (press against each other to be in close contact).

As a result, the cylindrical member is tightly fixed and the cylindrical gap (in particular, the cylindrical gap having an even width) is easily obtained. In addition, since the combustion products from the molded article of second gas generating agent is prevented from short-passing into the cylindrical gap, the ignition ability of the entire second gas generating agent is improved.

The cylindrical member has the central hole at the center of the bottom surface on the side of the second opening end (that is, the side on the side of the diffuser portion).

The gas diverting member has a cup-like shape and has a communication hole in a peripheral wall portion and a projection at the bottom surface, projecting toward the second combustion chamber. The gas diverting member is disposed so that the opening portion thereof faces the diffuser portion. The gas diverting member is disposed such that the central axis thereof is coincident with the central axis of the diffuser portion and the central axis of the cylindrical housing.

The projection on the bottom surface of the gas diverting member is fitted into the central hole of the cylindrical member on the side of the second end. Thereby, fixing of the cylindrical member at the second end and forming the cylindrical gap (in particular, the cylindrical gap having a constant width) is easily obtained. Furthermore, when the cylindrical member is fixed in this manner, by arranging the central axes of the diffuser portion, the cylindrical housing and the gas diverting member to be coincided with each other, these central axes can be easily coincided with the central axis of the cylindrical member.

It is preferably that the present invention provides a gas generator according to the invention, wherein the first porous plate member has the first through holes consisting of only the outer first through holes arranged in the circumferential direction only in the vicinity of the peripheral edge portion thereof, and the second porous plate member has a plurality of second through holes consisting of only outer second through holes arranged in the circumferential direction only in the vicinity of the peripheral edge portion thereof.

By using the cylindrical member and a combination of two porous plate members having the through holes only in the vicinity of the peripheral edge portion, it is possible to quickly open the gas discharge passage.

According to the gas generator of the present invention, the ignition portion of the igniter is disposed to protrude into the combustion chamber. Thus, even when a pocket-like annular space is formed in the combustion chamber, the entire molded article of the gas generating agent is not ignited with delay or not burn up completely regardless of the charging state of the molded article of the gas generating agent.

DESCRIPTION OF EMBODIMENTS

An embodiment of the present invention will be described with reference to FIGS. 1 to 5.

An igniter 16 which is an ignition device is attached to one end 10a of a cylindrical housing 10.

In the igniter 16, an igniter main body including an ignition portion 18, which is a known electric igniter, is fixed to a metallic collar 17 serving as a fixing member. The center (the center of a top surface 18a of the ignition portion 18) of the ignition portion 18 is coincident with the central axis X of the cylindrical housing 10.

The igniter 16 may be fixed to the metallic collar 17 in such a state that a part of the ignition portion 18 including an ignition charge is coated with a resin.

Figure 2:
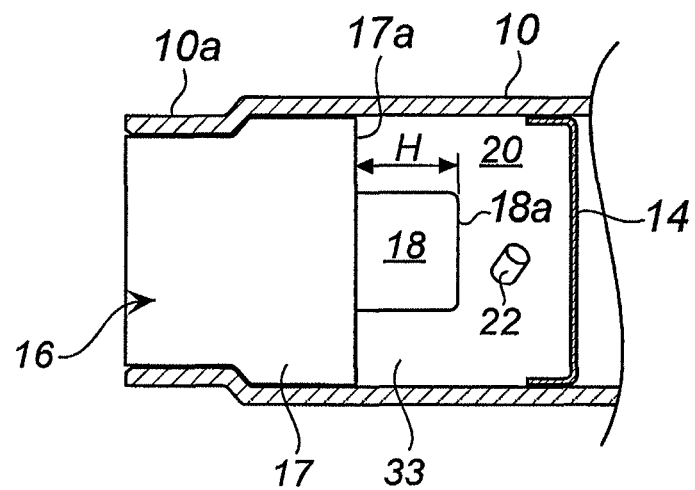
FIG. 2 shows a partial enlarged view of FIG. 1.

As the igniter 16, for example, as illustrated in FIG. 2 of JP-A No. 2001-165600, an initiator assembly 28, in which an initiator 32 is surrounded by a collar assembly 31 (a resin portion 36 and a metallic collar 40) and an ignition portion (an ignition charge 62 and a charge holder 64 surrounding the ignition charge 62) protrudes from the resin portion 36, may be used.

A first porous plate member 14 is disposed in the X-axis direction at a distance from the igniter 16. The center of the first porous plate member 14 is coincident with the axis X.

The first porous plate member 14 has an annular wall 14a formed on a peripheral edge of a circular bottom surface 14b and is fixed by press-fitting the annular wall 14a extended toward the igniter 16 to an inner peripheral wall surface of the cylindrical housing 10.

Figure 3:
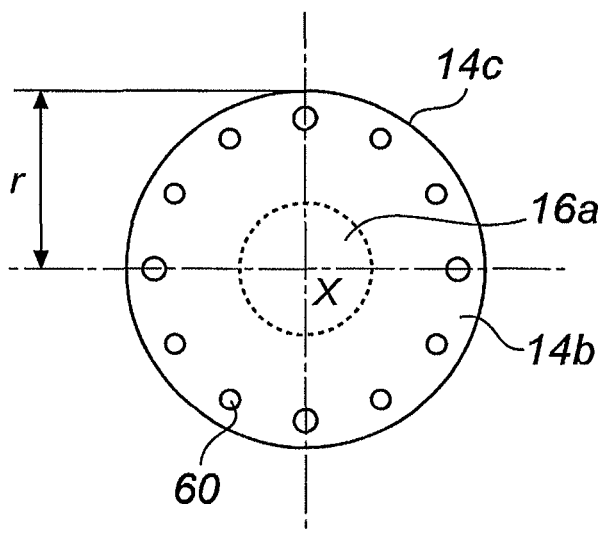
FIG. 3 shows a diagram illustrating an arrangement of through holes in a first porous plate member.

As illustrated in FIG. 3, the first porous plate member 14 has a plurality of first through holes (outer first through holes) 60 formed at an equal interval in the circumferential direction only in the vicinity of a peripheral edge portion that is in contact with the inner peripheral wall surface of the cylindrical housing 10. In FIG. 3 shows an embodiment such that the first through holes 60 consists of only the outer first through holes.

When r is a distance from the central point, where the axis X passes through, to the peripheral edge portion (a radius r of the first porous plate member 14), a position of each of the first thorough-holes 60 is set to be at about 0.1r of the length from the peripheral edge portion 14c to the centers of the respective first through holes 60.

The first through holes 60 are formed only in the peripheral edge portion excluding at least a region that the ignition portion 18 of the igniter 16 faces (a portion indicated by a dot line if FIG. 3).

The first through holes 60 may be additionally formed near the inner side of the circular bottom surface 14b (near the inner side than the outer first through holes formed in the peripheral edge portion). In this case, the proportion of a total opening area of only the outer first through holes formed only in the vicinity of the peripheral edge portion with respect to a total opening area of the first through holes 60 can be adjusted in a range between 95% and less than 100%, if additional first through holes are provided in the inner side of the outer first through holes. The first through holes 60 may be closed by a seal tape.

A space surrounded by the igniter 16 (the igniter 16 and the collar 17), the cylindrical housing 10, and the first porous plate member 14 is a first combustion chamber 20.

A molded article of first gas generating agent 22 is filled in the first combustion chamber 20 in a state of being pressed toward the igniter 16 by the first porous plate member 14.

Figure 4:
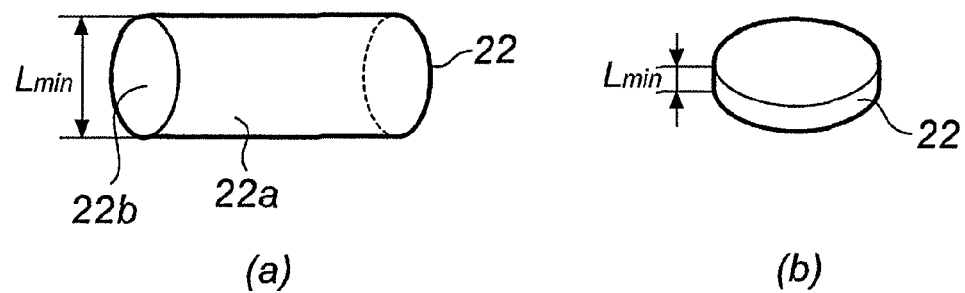
FIG. 4 shows, in (a) and (b) a perspective view of a molded article of the gas generating agent charged in a first combustion chamber.

The molded article of first gas generating agent 22 can be in a known shape, for example, in a cylindrical shape (including a cylindrical shape having a through hole or a recess) or a disk-like shape (including a disk-like shape having a through hole or a recess) as illustrated in (a) and (b) in FIG. 4.

The ignition portion 18 of the igniter 16 protrudes into the first combustion chamber 20 from an annular surface (bottom surface) 17a of the igniter collar 17.

Thereby, a pocket-like annular space 33, whose bottom surface is the annular surface 17a, is formed around the ignition portion 18 in the first combustion chamber 20. The molded article of first gas generating agent 22 is also charged in the annular space 33.

The annular space 33 is within a range of a height (H) from the annular surface 17a of the igniter collar 17 to the top surface 18a of the ignition portion 18 before activation.

The height (H) from the annular surface 17a to the top surface 18a of the ignition portion 18 and a smallest length (Lmin) of the molded article of first gas generating agent 22 charged in the first combustion chamber 20 satisfy a relation of Lmin<H.

A step may be formed in the annular surface 17a depending on a structure or a shape of the igniter collar 17. In such a case, the height H may be from a deeper bottom surface to the top surface 18a of the ignition portion 18, or may be from a higher bottom surface to the top surface 18a of the ignition portion 18. The molded article of first gas generating agent 22 can be arranged aslant in the annular space 33 as long as the molded article of first gas generating agent 22 does not protrude outside the annular space 33 in the height H direction (beyond the top surface 18a of the ignition portion 18). The arrangement direction, shape, and dimensions thereof are not particularly limited. The present invention includes a case where there is at least one molded article of first gas generating agent 22 provided in the annular space in such a state.

The molded article of the gas generating agent 22, when used in a cylindrical shape shown in (a) in FIG. 4 and in a disk-like shape shown in (b) in FIG. 4, will be described.

In the molded article of first gas generating agent 22 having a cylindrical shape shown in (a) in FIG. 4, the smallest length (Lmin) is a diameter of an end surface 22b.

In the case of the molded article of first gas generating agent 22 having a disk-like shape shown in (b) in FIG. 4, the smallest length (Lmin) is the thickness of the disk.

Figure 5:
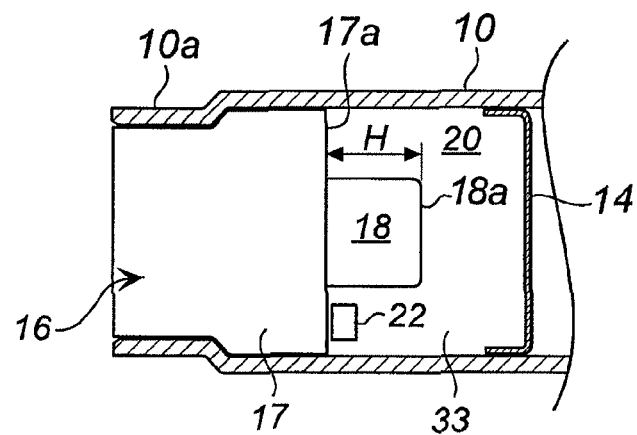
FIG. 5 shows a diagram for describing a charging state of the molded article of the gas generating agent in the first combustion chamber.

When the molded article of first gas generating agent 22 having the cylindrical shape shown in (a) in FIG. 4, for example, is charged in the first combustion chamber 20, a peripheral surface 22a of the molded article of first gas generating agent 22 having the cylindrical shape may be charged in a state of abutting against the annular surface 17a of the igniter collar 17 as shown in FIG. 5.

In this case, as long as the relation of Lmin<H is satisfied, the molded article of first gas generating agent 22 is always present inside the annular space 33 and will not protrude out of the top surface 18a of the ignition portion 18.

A gas generating agent having a good ignition property and a good combustion maintaining property (with a high combustion temperature) can be used as the molded article of first gas generating agent 22.

The combustion temperature of the molded article of first gas generating agent 22 is preferably within a range of 1700° C. to 3000° C.

The molded article of first gas generating agent 22 may be formed by a composition including nitroguanidine (34% by weight) and strontium nitrate (56% by weight), for example.

A diffuser 12 is attached to the opposite end (the other end) 10b of the cylindrical housing 10 to form a diffuser portion.

The diffuser 12 has a substantially cup-like shape including a flange portion 12a, a peripheral wall portion 12b, and a bottom portion 12c, and is welded and fixed to the cylindrical housing 10 at the flange portion 12a.

A plurality of gas discharge ports 15 is formed on the peripheral wall portion 12b.

A cup-like shaped member 40 serving as is gas diverting member is disposed inside the end (at the opposite end 10b) of the cylindrical housing 10, on the diffuser 12 side. The cup-like shaped member 40 includes a bottom surface 40a and a peripheral wall portion 40b. The peripheral wall portion 40b is provided with a plurality of communication holes 40c. A projection 40d is formed at a central part of the bottom surface 40a so as to extend toward the igniter 16.

The cup-like shaped member 40 is fixed by a known method (welding or the like) to the flange portion 12a of the diffuser 12. An opening of the cup-like shaped member 40 is closed by a seal tape 45 so that moisture from the gas discharge ports 15 is prevented from entering.

An outer diameter of the cup-like shaped member 40 is smaller than an inner diameter of the cylindrical housing 10. Therefore, a gap 36 exists between the peripheral wall portion 40b and the inner peripheral wall surface of the cylindrical housing 10, and comes to a dead end at the flange portion 12a of the diffuser, forming a pocket portion (gap) 36. The pocket portion 36 is continuous with a cylindrical gap 35 and functions to retain the particulate in combustion gas.

A second combustion chamber 25 is provided in the cylindrical housing 10 between the diffuser 12 (the cup-like shaped member 40) and the first combustion chamber 20 (the first porous plate member 14).

The second combustion chamber 25 is surrounded by the cylindrical member 30, the second porous plate member 32 and the inner peripheral wall surface of the cylindrical housing 10. A molded article of second gas generating agent 50 is charged in the second combustion chamber 25.

The cylindrical member 30 includes a peripheral wall portion 30a having a smaller outer diameter than the inner diameter of the cylindrical housing 10, and a cylindrical gap 35 having a uniform width is formed between the peripheral wall portion 30a and the cylindrical housing 10.

In the cylindrical member 30, a plurality of gas passage holes (communication holes) 37 are formed axially at equal intervals on the peripheral wall portion 30a. The gas passage holes 37 are formed at equal intervals in the circumferential direction of the cylindrical member 30 (the peripheral wall portion 30a). The second combustion chamber 25 and an annular gap 35 communicate with each other through the gas passage holes 37. Note that the gas passage holes 37 may be unevenly distributed closer to the diffuser portion 12 on the peripheral wall portion 30a. Further, the gas passage holes 37 may be formed so that the opening area thereof increases toward the diffuser portion 12.

The cylindrical member 30 has, in a first opening end thereof, an enlarged diameter portion 31 formed in a flange-like shape on the side of the igniter 16. An outer peripheral edge 31a of the enlarged diameter portion 31 abuts against the inner peripheral wall surface of the cylindrical housing 10.

An outer diameter of the outer peripheral edge 31a is slightly larger than the inner diameter of the cylindrical housing 10 before the cylindrical member 30 is disposed inside the cylindrical housing 10. When the cylindrical member 30 is disposed inside the cylindrical housing 10, the cylindrical member 30 is press-inserted to the inner peripheral wall surface of the cylindrical housing 10 due to the resilience of the enlarged diameter portion 31. Therefore, a gap is not formed in the press-fitted portion. Further, in order to fix the cylindrical member 30, a step that fits into an opening peripheral edge of the enlarged diameter portion 31 or a projection that engages with the opening peripheral edge may be formed on the inner peripheral wall surface of the cylindrical housing 10.

In the cylindrical member 30, a central hole 30d is formed at a central portion of a bottom surface 30b on the side of the diffuser portion 12 (a second end of the cylindrical member 30). The central hole 30d is fitted to the projection 40d formed on the bottom surface 40a of the cup-like shaped member 40.

Since the enlarged diameter portion 31 is press-fitted to the inner peripheral wall surface of the cylindrical housing 10 and the central hole 30d is fitted to the projection 40d of the cup-like shaped member 40, the cylindrical member 30 is fixed in both the axial direction and the radial direction and is disposed on the same X-axis as the cylindrical housing 10.

The second porous plate member 32 is disposed at a distance (for example, approximately 3 mm to 20 mm) in the X-axis direction from the first porous plate member 14, and the center of the second porous plate member 32 is coincident with the axis X.

The second porous plate member 32 has an annular wall 32a which is formed on a peripheral edge of a circular bottom surface 32b so as to extend toward the igniter 16. The second porous plate member 32 is fixed by the annular wall 32a press-inserted to the inner peripheral wall surface of the cylindrical housing 10.

A space 19 is formed between the second porous plate member 32 and the first porous plate member 14. A volume (the gap between the first and second porous plate members 14 and 32) of the space 19 changes depending on a shape and an amount of each of the molded article of the gas generating agent 22 and 50 charged in the respective combustion chambers 20 and 25.

Second through holes 65 of the second porous plate member 32 are openings smaller than the molded article of second gas generating agent 50. The second through holes 65 may be closed by a seal tape.

An arrangement of the second through holes 65 of the second porous plate member 32 is not particularly limited, and a preferred embodiment will be described with reference to (a) to (c) in FIG. 6.

Figure 6:
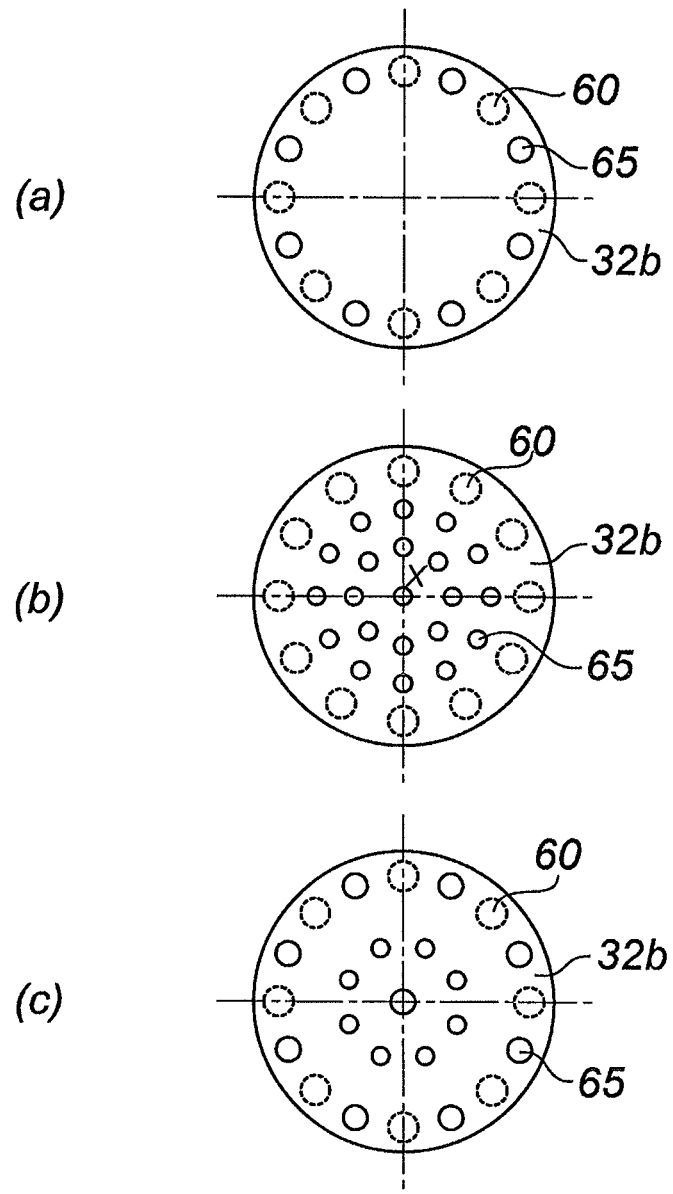
FIG. 6 shows, in (a), (b) and (c) a diagram illustrating an arrangement of through holes in a second porous plate member.

FIG. 6 shows the second porous plate member 32 seen from the diffuser portion 12 of FIG. 1. The first through holes 60 are depicted by dot lines because the first porous plate member 14 is completely concealed by the second porous plate member 32.

(a) in FIG. 6 shows a state where the first through holes 60 and the second through holes 65 do not face each other in the X-axis direction.

This does not indicate that the first through holes 60 in FIG. 3 and the second through holes 65 in (a) in FIG. 6 are arranged differentially. These holes are formed in the same manner on each of the respective porous plate member, however, arranged circumferntially inconsistent with each other when provided inside the cylindrical housing 10, so that the first through holes 60 and the second through holes 65 does not face each other.

The first through holes 60 and the second through holes 65 can be arranged to face each other in the X-axis direction, or a part of the respective through holes 60 and 65 can overlap in the X-axis direction.

The second porous plate member 32 in (a) of FIG. 6 is preferable, when combined with the cylindrical member 30, because ignition of the molded article of second gas generating agent 50 existing in the vicinity of the peripheral wall portion 30a of the cylindrical member 30 is accelerated so that the gas discharge passage is opened quickly.

Moreover, for example, as shown in (b) in FIG. 6, the second through holes 65 can be formed only in a central portion (the portion located radially further inside than the first through holes 60) in the second porous plate member 32, excluding the peripheral edge portion in contact with the inner peripheral wall surface of the cylindrical housing 10.

When the second through holes 65 are arranged as shown in (b) in FIG. 6, the positions of the first and second through holes 60 and 65 do not overlap in the X-axis direction.

Furthermore, for example, as shown in (c) in FIG. 6, the formation positions of the second through holes 65 shown in (a) and (b) in FIG. 6 can be combined.

The molded article of second gas generating agent 50 uses a gas generating agent having a lower combustion temperature than the molded article of first gas generating agent 22. The combustion temperature of the molded article of second gas generating agent 50 is preferably within a range of 1000° C. to 1700° C. The molded article of second gas generating agent 50 can be in a single perforated cylindrical shape having an outer diameter of 1.8 mm, an inner diameter of 0.7 mm and a length of 1.9 mm, and include guanidine nitrate (41% by weight), basic copper nitrate (49% by weight), a binder and an additive.

The molded article of second gas generating agent 50 is charged in a state of being pressed by the second porous plate member 32 toward the diffuser portion 12. Thereby, the molded article of second gas generating agent 50 is densely charged in the second combustion chamber 25 and the formation of a gap is prevented.

A ratio (a2/a1) of a total opening area (a2) of the second through holes 65 formed in the second porous plate member 32 to a total opening area (a1) of the first through holes 60 formed in the first porous plate member 14 is preferably between 0.9 and 1.2, and more preferably between 0.95 and 1.1.

Next, operations of the gas generator shown in FIG. 1 will be described.

When the igniter 16 is activated, a central portion of the ignition portion 18 starts breaking and combustion products generated therefrom collides with a surface of the first porous plate member 14 where the first through holes 60 are not formed, and a part of the combustion products diffuses toward the outer side in the radial direction and the collar 17.

When the first porous plate member 14 of the present invention is used, the combustion products reflect by striking the central portion (the portion where the first through holes 60 are not formed or the portion where the opening area of the first through holes 60 is small) in the first porous plate member 14 so that the combustion products can easily reach the molded article of first gas generating agent 22 filled in the pocket-like annular space 33.

As a result, the entire molded article of first gas generating agent 22 in the first combustion chamber 20 ignites easily.

When the internal pressure of the first combustion chamber 20 increases with the combustion products (flames and high-temperature gas) generated from the molded article of first gas generating agent 22, the seal tape closing the first through holes 60 is broken so that the combustion products flow into the space 19 therethrough.

The combustion products flowing into the space 19 flow into the second combustion chamber 25 through the second through holes 65 of the second porous plate member 32 to ignite and burn the molded article of second gas generating agent 50.

The combustion gas and the combustion products generated in the second combustion chamber 25 flow into the cylindrical gap 35 via the gas passage holes 37 and collide with the inner peripheral wall surface of the cylindrical housing 10.

As a result, the flow is directed toward the diffuser 12. During this process, residues contained in the gas adhere to the inner peripheral wall surface of the cylindrical housing 10.

Furthermore, the combustion gas and the combustion products strike the flange portion 12a of the diffuser portion 12 thereby changing the flow direction thereof, and enter the cup-like shaped member 40 through the communication holes 40c. After that, the combustion gas and the combustion products strike the bottom portion 12c of the diffuser 12 thereby changing the flow direction thereof again, and are discharged from the gas discharge ports 15.

Since the first and second porous plate members 14 and 32 are press-inserted to the cylindrical housing 10, even though the porous plate members may move in the X-axis direction due to the pressure during activation, due to a gap corresponding to the length of the annular wall 32a maintained between the first and second porous plate members 14 and 32, the space 19 is thus maintained.

When the second porous plate member 32 as shown in (a) in FIG. 6 is used in the gas generator in FIG. 1, the following advantageous effects are obtained.

Although the gap 35 serving as a gas discharge passage is formed due to the cylindrical member 30 disposed in the cylindrical housing 10, the gap 35 is not formed on the side of the second porous plate member 32.

When the second porous plate member 32 provided with the second through holes 60 arranged in the peripheral edge portion as shown in (a) in FIG. 6 is used, the combustion products are discharged in the direction along the peripheral wall portion 30a of the cylindrical member 30, and therefore, the molded article of second gas generating agent 50 near the gas passage holes 37 is preferentially combusted.

As a result, since a gas discharge passage between the second through holes 65 and the gas passage holes 37 (the gas passage holes 37 closest to the second porous plate member 32) is formed in the second combustion chamber 25 promptly, gas is discharged from the housing 10 reliably and quickly.

When the second porous plate member 32 as shown in (b) in FIG. 6 is used in the gas generator in FIG. 1, a molded article of second gas generating agent 50 in part facing the second porous plate member 32 is more likely to be combusted uniformly. As results, combustion of the second combustion chamber 25 starts in advance in the end surface or one end in the axial direction on the side of the second porous plate member.

When the second porous plate member 32 as shown in (c) in FIG. 6 is used in the gas generator in FIG. 1, both effects of the second porous plate members 32 shown in (a) and (b) in FIG. 6 are obtained.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator, comprising
   a cylindrical housing with an ignition device attached at one end and a diffuser portion, which has a gas discharge port, attached at the other end,
   a first combustion chamber formed inside the cylindrical housing at the one end to which the ignition device is attached, being defined by a first porous plate member, and being charged with a molded article of first gas generating agent,
   a second combustion chamber formed in the cylindrical housing and defined by a second porous plate member, which is disposed axially at a distance from the first porous plate member and has a second through hole, the second combustion chamber being charged with a molded article of second gas generating agent,
   the ignition device provided by fixing an igniter main body with a columnar ignition portion, to a fixing member including an igniter collar, the ignition portion disposed to protrude inside the first combustion chamber,
   the first porous plate member having first through holes, a proportion of a first total opening area of only outer first through holes arranged in the vicinity of a peripheral edge portion and in a circumferential direction of the first porous plate member to a total opening area of the first through holes in the first porous plate member being not less than 95%,
   axial end surfaces of the first combustion chamber, respectively, formed by the first porous plate member, and the ignition portion of the igniter main body and the igniter collar,
   an annular space formed between an outer peripheral surface of the ignition portion and an inner peripheral wall surface of the cylindrical housing, which radially faces the outer peripheral surface of the ignition portion, the annular space having a bottom surface defined by the igniter collar,
   a height (H) of a top surface of the ignition portion from the bottom surface and a smallest length (Lmin) of the molded article of first gas generating agent charged in the first combustion chamber satisfying a relation of Lmin<H, and
   an axis X of the cylindrical housing being coincident with a central line of the ignition portion of the igniter main body, the first porous plate member, and the second porous plate member.

2. The gas generator according to claim 1, wherein H/Lmin is in the range of 2 to 5.

3. The gas generator according to claim 1, wherein the first porous plate member has the first through holes consisting of only the outer first through holes formed in the circumferential direction and only in the vicinity of the peripheral edge portion thereof.

4. The gas generator according to claim 1, wherein a ratio (a2/a1) of a total opening area (a2) of the second through hole formed in the second porous plate member and a total opening area (a1) of the first through holes formed in the first porous plate member is between 0.9 and 1.2.

5. The gas generator according to claim 1, wherein a cylindrical member provided with a communication hole in a peripheral wall portion is further disposed in the second combustion chamber,
   the cylindrical member is disposed so as to form a gap between an inner peripheral wall surface of the cylindrical housing and the peripheral wall portion of the cylindrical member, and
   the cylindrical member has a first opening end on a side of the second porous plate member, that abuts against the inner peripheral wall surface of the cylindrical housing, and, at the opposite side, a second end that is supported on a side of the diffuser portion.

6. The gas generator according to claim 5, wherein the cylindrical member includes an enlarged diameter in which a diameter of an opening portion on a side of the first opening end is enlarged and a central hole formed at a center of a bottom surface on a side of the second end,
   a cup-like shaped gas diverting member having a communication hole in a peripheral wall portion and a projection on a bottom surface, is disposed on the side of the diffuser portion, whose opening is arranged to face the diffuser portion,
   the first opening end of the cylindrical member abuts against the inner peripheral wall surface of the cylindrical housing, and
   the central hole of the cylindrical member is fitted to the projection on the bottom surface of the gas diverting member.

7. The gas generator according to claim 5, wherein the first porous plate member has the first through holes consisting of only the outer first through holes arranged in the circumferential direction only in the vicinity of the peripheral edge portion thereof, and
   the second porous plate member has a plurality of second through holes consisting of only outer second through holes arranged in the circumferential direction only in the vicinity of the peripheral edge portion thereof.

* * * * *